(12) United States Patent
Yamada et al.

(10) Patent No.: US 7,837,019 B2
(45) Date of Patent: Nov. 23, 2010

(54) CLUTCH DEVICE FOR A SEAT LIFTING APPARATUS OF A VEHICLE

(75) Inventors: Yukifumi Yamada, Toyota (JP); Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/564,764

(22) Filed: Sep. 22, 2009

(65) Prior Publication Data

US 2010/0018832 A1   Jan. 28, 2010

Related U.S. Application Data

(63) Continuation of application No. 11/610,630, filed on Dec. 14, 2006, now abandoned.

(30) Foreign Application Priority Data

Dec. 16, 2005   (JP) .............................. 2005-363956
Dec. 28, 2005   (JP) .............................. 2005-377509

(51) Int. Cl.
*F16D 13/76*   (2006.01)

(52) U.S. Cl. ...................................... 192/16

(58) Field of Classification Search ........................ None
See application file for complete search history.

(56) References Cited

U.S. PATENT DOCUMENTS

| 6,273,233 | B1 | 8/2001 | Denis |
| 6,481,557 | B2 | 11/2002 | Denis |
| 6,508,347 | B1 | 1/2003 | Hochmuth |
| 6,675,945 | B2 | 1/2004 | Kim |
| 6,951,270 | B2 | 10/2005 | Liu |
| 6,955,251 | B2 | 10/2005 | Kurita et al. |
| 7,032,731 | B2 | 4/2006 | Kim |
| 2007/0137965 | A1 | 6/2007 | Yamada et al. |

FOREIGN PATENT DOCUMENTS

JP   2003-93187   4/2003

*Primary Examiner*—Dirk Wright

(74) *Attorney, Agent, or Firm*—Oblon, Spivak, McClelland, Maier & Neustadt, L.L.P.

(57) ABSTRACT

A clutch device for a seat lifting apparatus of a vehicle includes a friction brake portion for transmitting rotation of an operational lever to an output shaft, an output gear provided at the output shaft, a biasing force receiving portion provided at the output shaft for receiving a biasing force which assists a rotation of the output shaft, a first bearing portion provided at one side of the biasing force receiving portion and the output gear and a second bearing portion provided at the other side of the biasing force receiving portion and the output gear. The first bearing portion and the second bearing portion rotatably support the output shaft at both sides of the biasing force receiving portion and the output gear.

7 Claims, 9 Drawing Sheets

CLUTCH DEVICE FOR A SEAT LIFTING APPARATUS OF A VEHICLE

CROSS REFERENCE TO RELATED APPLICATIONS

This application is a continuation based on U.S. application Ser. No. 11/610,630 filed on Dec. 14, 2006. U.S. application Ser. No. 11/610,630 is based on and claims priority under 35 U.S.C. §119 to Japanese Patent Applications No. 2005-363956, filed on Dec. 16, 2005, No. 2005-377509, filed on Dec. 28, 2005, the entire content of which is incorporated herein by reference.

FIELD OF THE INVENTION

The present invention relates to a seat adjusting apparatus for a vehicle, which adjusts a height of a seat cushion. More specifically, the present invention pertains to a clutch mechanism of a seat adjusting apparatus for a vehicle.

BACKGROUND

Conventionally known are seat adjusting apparatuses for vehicles, which adjust the height of a seat cushion. In such seat adjusting apparatus, the height of the seat cushion is adjustable upon an operation of an operating lever in cases where an occupant is seated on the seat.

For example, according to a seat adjusting apparatus for a vehicle disclosed in JP2003-93187A (FIGS. 11, 12 and 13), provided are a first clutch mechanism and a second clutch mechanism. The first clutch mechanism transmits an operation force applied to the operating lever to a control member via an input side member connected to the operating lever. When the operating lever is not operated, force transmission between the input side member and the control member is cut off. Further, when the operating lever is operated, the second clutch mechanism transmits the operation force to the output shaft via the control member. When the operating lever is not operated, the second clutch mechanism locks the output shaft against rotation.

In the first clutch mechanism, rollers are arranged in a wedge-shaped space defined between a cam surface provided at the input side member connected to the operating lever and an cylindrical surface of the control member. The control member rotates with the rollers engaged in response to rotation of the input side member. When the operating lever is released from being operated, the input side member is returns to the original neutral position.

However, according to the above-described structure, if the rollers rotate slowly relative to the rotation of the input side member in a situation where the input side member returns, the rollers arranged in the wedge-shaped space wedge-shaped space are occasionally trapped, i.e., engaged, between the cam surface and the cylindrical surface. In order to prevent a rotational error due to such engagement, a play is provided for the rollers in the wedge-shaped space. However, such play causes deterioration in an operation feeling due to a delayed movement of the rollers relative to the operation of the operating lever.

The present invention has been made in view of the above circumstances and provides a seat adjusting apparatus for a vehicle in which an operational performance of the operating member at the neutral position is enhanced.

SUMMARY OF THE INVENTION

According to an aspect of the present invention, a seat adjusting apparatus for a vehicle having a seat lifted up and down in response to a rotation of an output shaft following an operation of an operating lever, includes: a first clutch mechanism and a second clutch mechanism. The first clutch mechanism is connected to the operating lever and includes: an input side member connected to the operating member and having a cam surface and a first engagement portion; a control member having an inner peripheral surface facing the cam surface in a radial direction, a wedge-shaped space being defined between the inner peripheral surface and the cam surface; and at least one roller arranged in the wedge-shaped space. In the first clutch mechanism, operation force of the operating member is transmitted to the control member when the operating member is operated, and force transmission between the input side member and the control member is discontinued when the operating member returns to an original position. The second clutch mechanism includes: a static member housing the output shaft to be rotatable. In the second clutch mechanism, operation force of the operating member is transmitted to the output shaft from the control member when the operating member is operated, and the control member is engaged with the static member when the operating member is not operated so that the output shaft is locked not to rotate. The seat adjusting apparatus further includes a return member having a contact portion and a second engagement portion. The contact portion is configured to come in contact with the roller and is positioned in the wedge-shaped space. The contact portion is located at a side of an area, where a distance between the cam surface and the inner peripheral surface is more reduced than that of an area where the roller is located. The second engagement portion is engaged in a circumferential direction with the first engagement so that the return member rotates integrally with the input side member.

DETAILED DESCRIPTION

An embodiment of the present invention is described below with reference to the attached drawings.

Figure 1:
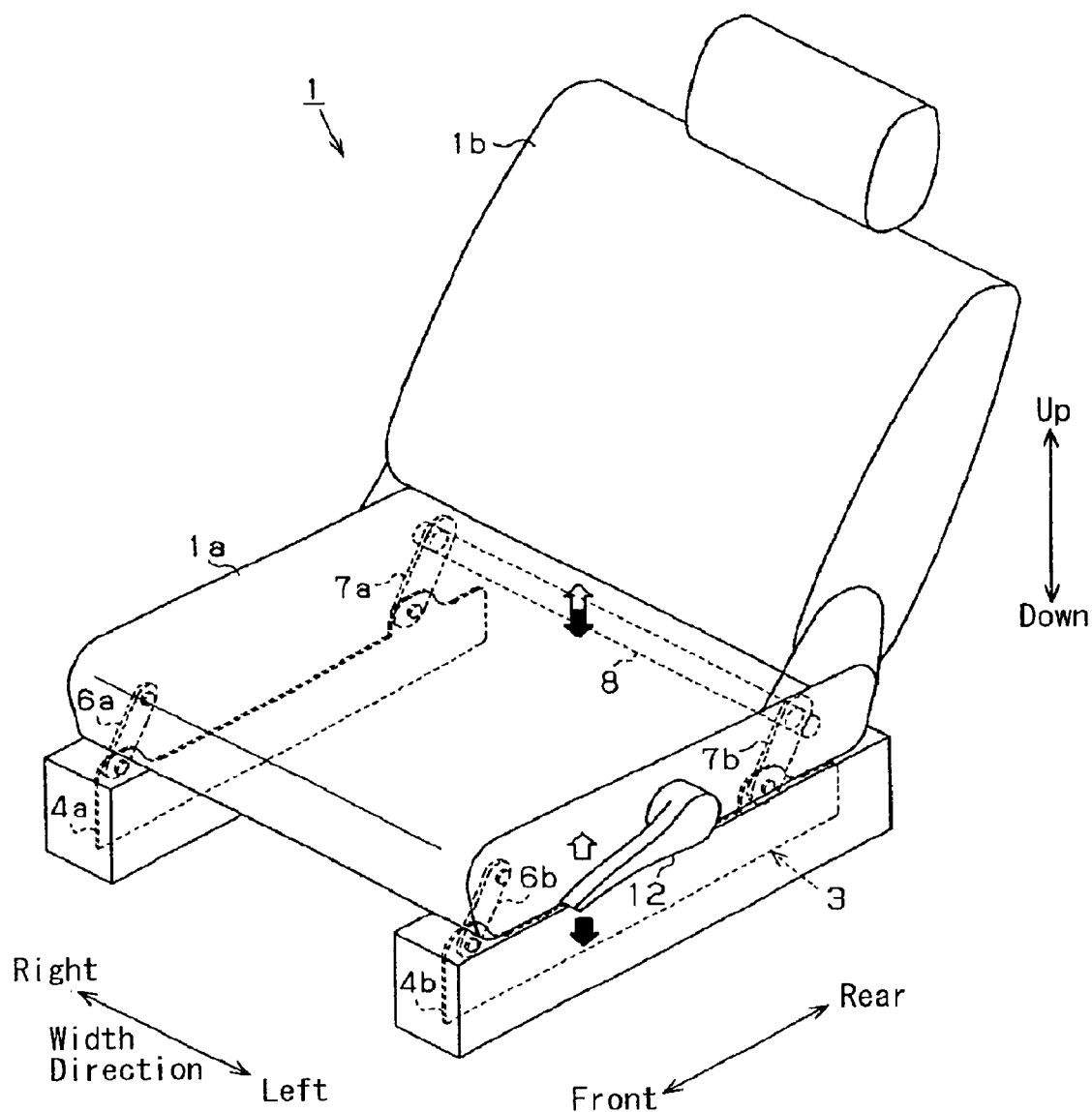
FIG. 1 is a perspective view of a seat for a vehicle having a seat adjusting apparatus according to an embodiment of the present invention.
Figure 2:
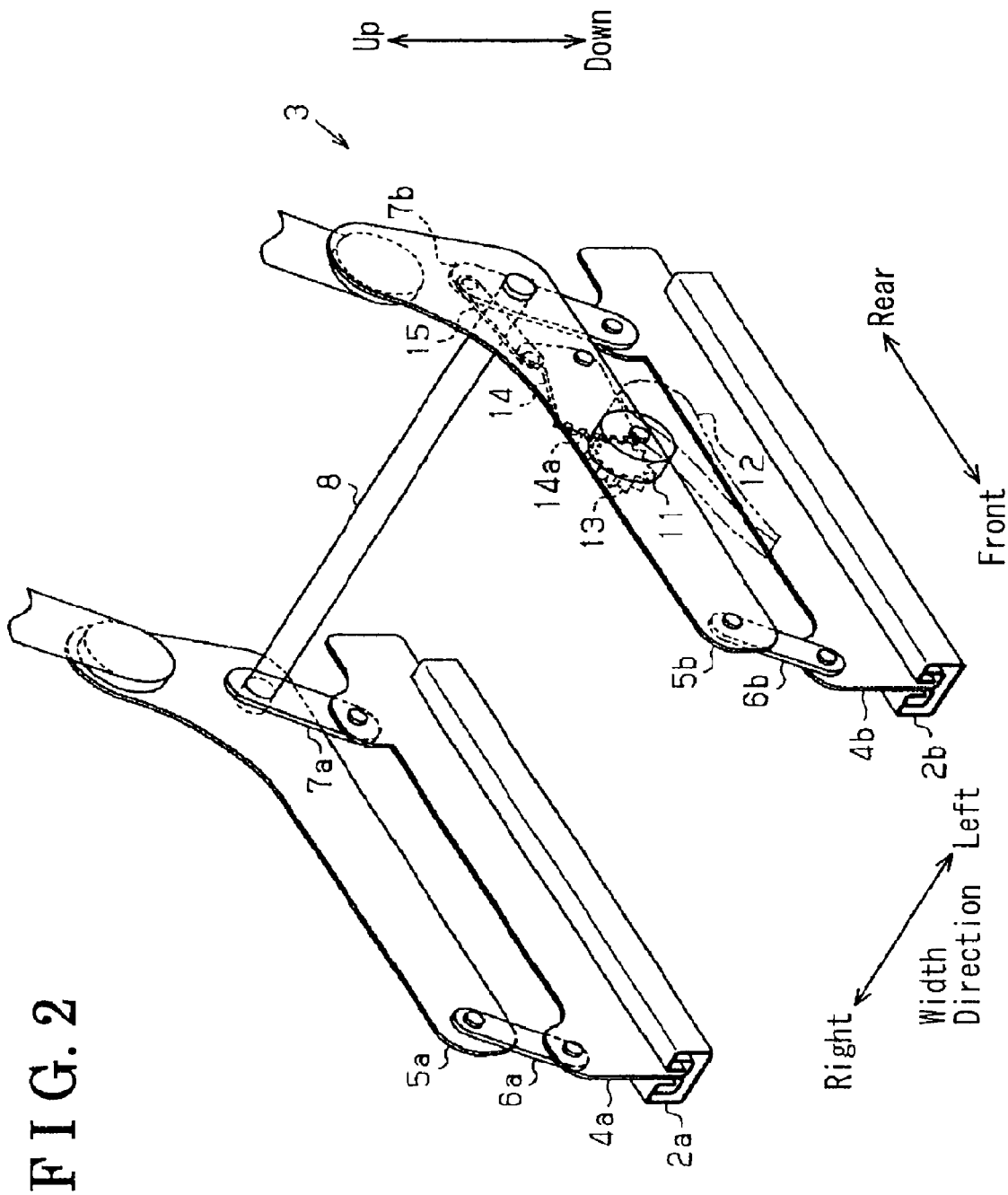
FIG. 2 is a perspective view illustrating the seat adjusting apparatus.

As illustrated in FIGS. 1 and 2, a seat 1 for a vehicle includes a seat cushion 1a and a seatback 1b extending in an inclined upward direction from a rear end upper surface of the seat cushion 1a. The seat 1 is supported to be rotatable over lower rails 2a and 2b secured to a floor of the vehicle. Provided is a seat adjusting apparatus 3 under the seat cushion 1a, which adjusts the height or the surface level of the seat cushion 1a.

The lower rails 2a and 2b are mounted with the upper rails 4a and 4b slidable over the lower rails 2a and 2b. The upper rails 4a and 4b support base frames 5a and 5b of the seat cushion 1a to be lifted up and down, respectively.

Lifter links 6a and 7a are supported at front and rear ends of the upper rail 4a so as to pivot about lower ends, respectively. The lifter links 6a and 7a are further connected to front and rear ends of the base frame 5a so as to pivot about upper ends, respectively. Likewise, lifter links 6b and 7b are supported at front and rear ends of the upper rail 4b so as to pivot about lower ends, respectively. The lifter links 6b and 7b are further connected to front and rear ends of the base frame 5b so as to pivot about upper ends, respectively. The joining point between the lifter link 7a and the base frame 5a is connected to the joining point between the lifter link 7b and the base frame 5b via an approximately cylindrical torque rod 8. Therefore, the base frames 5a and 5b are interlocked with each other to be lifted up and down.

The base frame 5b is equipped with a clutch mechanism 11 configuring the seat adjusting apparatus 3. An operating lever 12, which serves as an operating member, is attached to the clutch mechanism 11. A pinion gear 13 is mounted at an output shaft of the clutch mechanism 11. The pinion gear 13 rotates in response to operation of the operating lever 12. A sector gear 14 is supported at the base frame 5b behind the clutch mechanism 11 so as to rotate about its lower base end. The sector gear 14 is formed, at a distal end, with teeth 14a engaged with the pinion gear 13. The sector gear 14 is hence rotated in response to rotation of the pinion gear 13. An upper base end of the sector gear 14 is connected to an upper end of the lifter link 7b via the driving link 15 in a manner that the driving link 15 allows the sector gear 14 and the lifter link 7b to pivotably rotate. Therefore, once the sector gear 14 is pivoted, the lifter link 7b is pivoted via the driving link 15 and the lifter link 7a is pivoted via the torque rod 8, wherein the base frames 5a and 5b are interlocked with each other to be lifted up or down.

Figure 3:
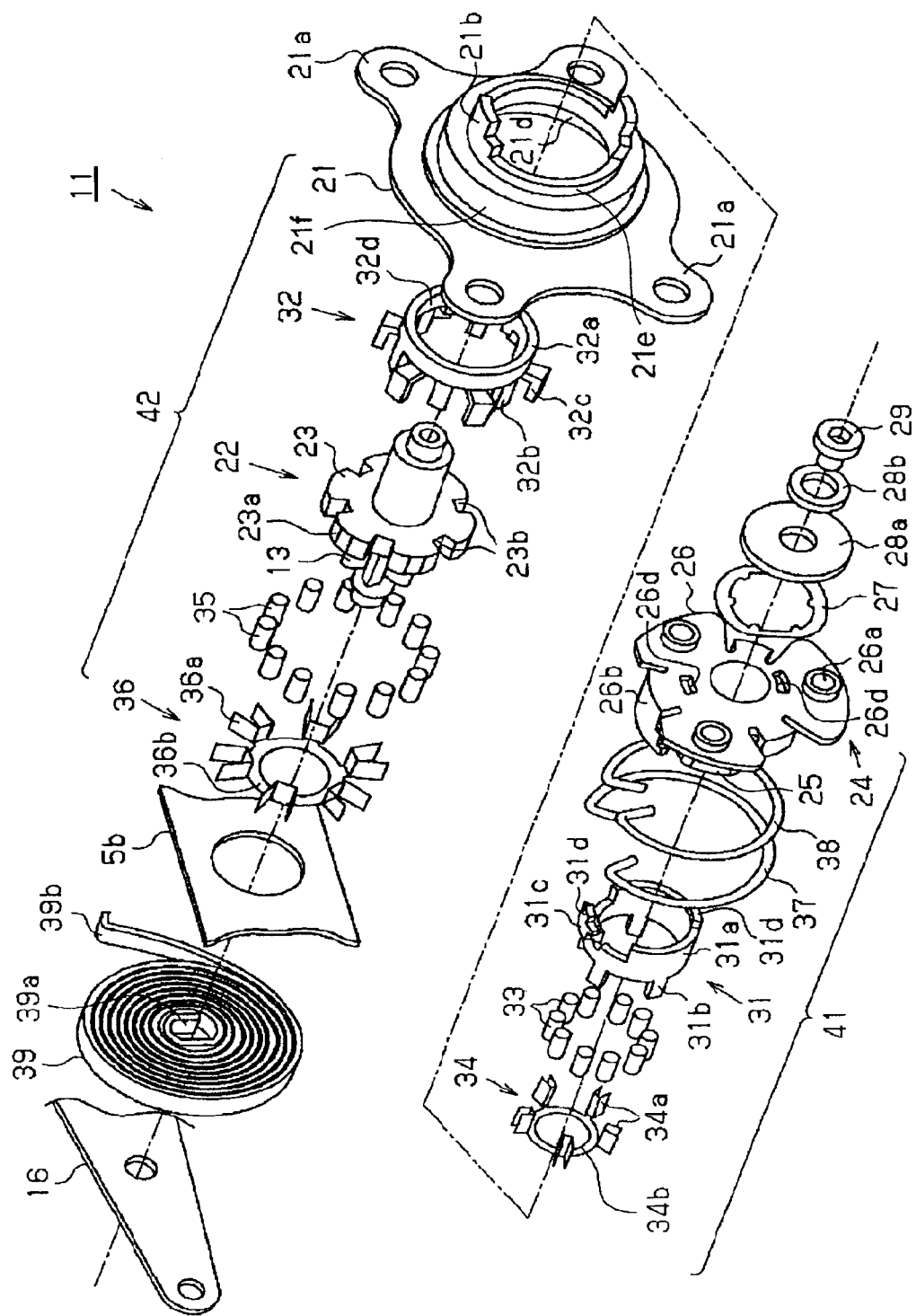
FIG. 3 is an exploded perspective view of a clutch apparatus of the seat adjusting apparatus.
Figure 4:
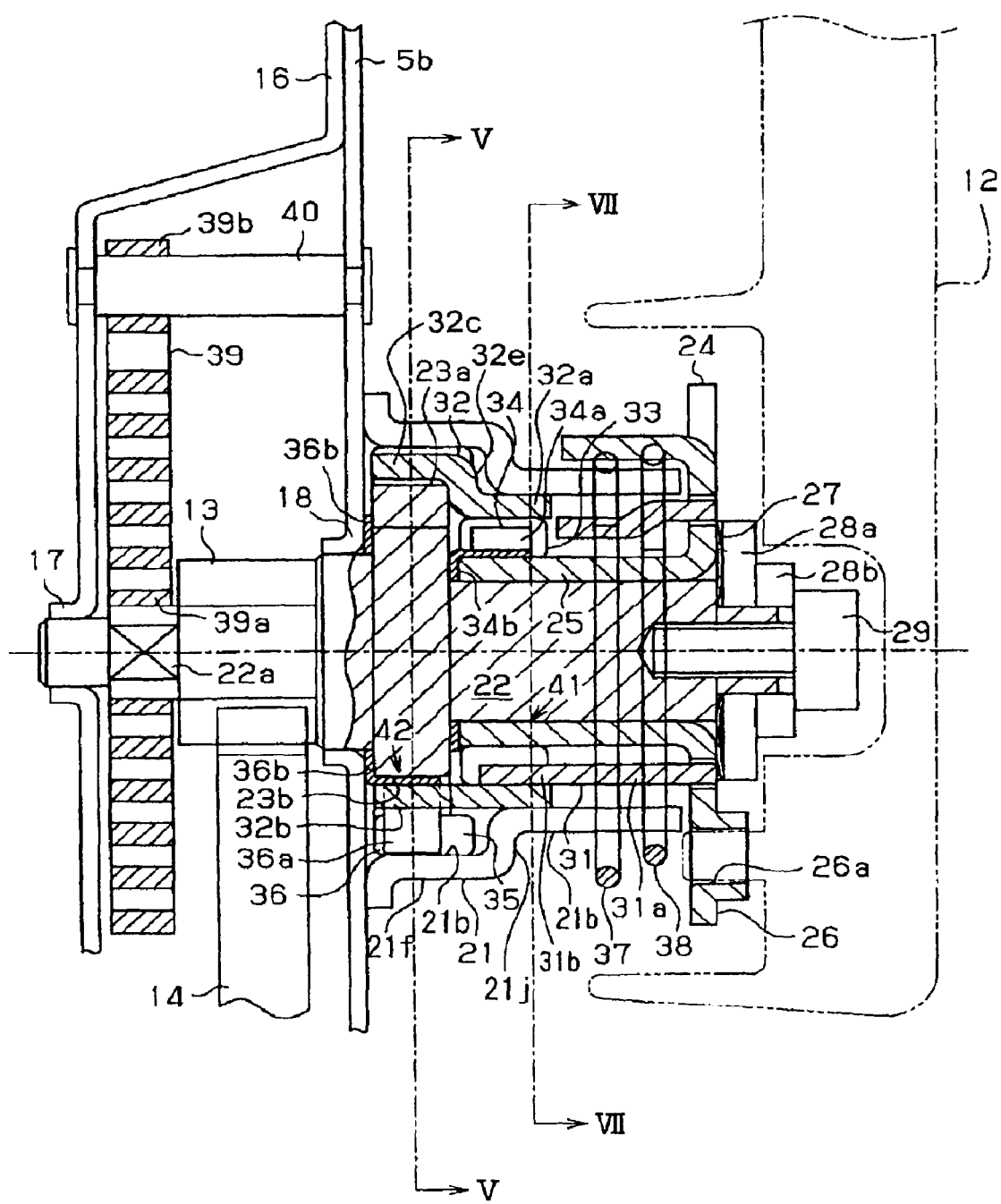
FIG. 4 is a sectional view of the clutch apparatus.
Figure 5:
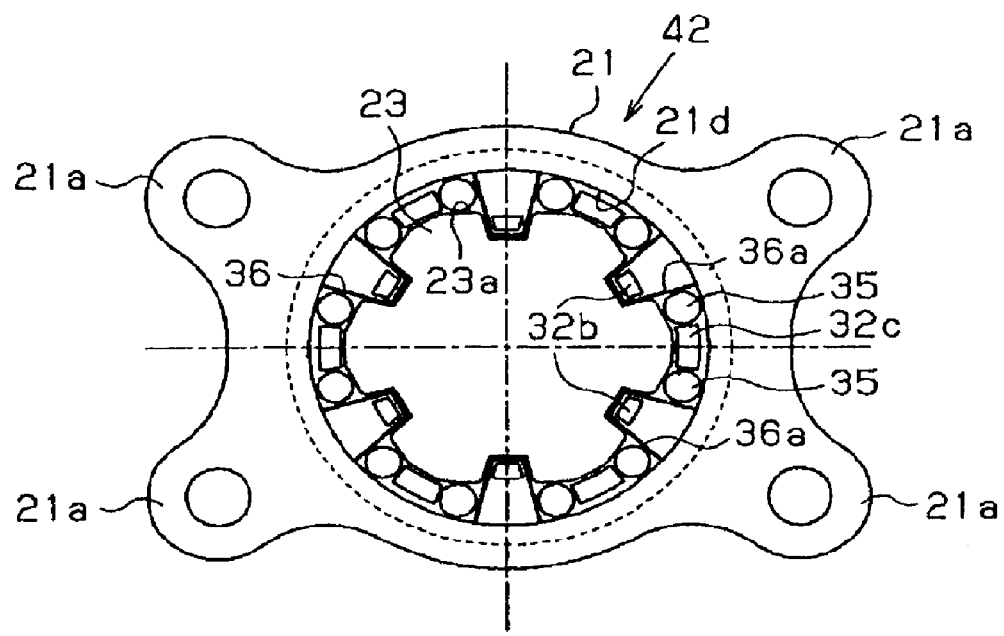
FIG. 5 is a sectional view taken along line V-V in FIG. 4.
Figure 6:
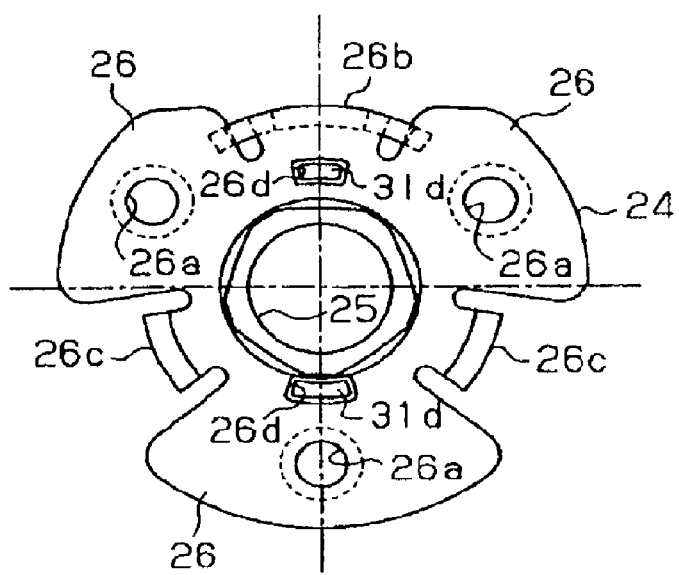
FIG. 6 is an explanatory view for explaining an input side member.

Described below is a detailed structure of the clutch mechanism 11. As illustrated in FIGS. 3 and 4, the clutch mechanism 11 includes an approximately cylindrically shaped case 21 as a static member. As illustrated in FIG. 5, the case 21 is fixedly attached to the base frame 5b via multiple attaching portions 21a protruding outwardly in a radial manner. Further, as illustrated in FIG. 6, the case 21 is formed with a hook portion 21b and engagement strips 21c (see FIGS. 10A, 10B and 10C) protruding in the axial direction. The case 21 is formed with a reduced diameter portion 21e as a cylindrical portion at the side of the operating lever 12 and an enlarged diameter portion 21f as a cylindrical portion at the opposite side to the operating lever 12. The reduced diameter portion 21e is connected to the enlarged diameter portion 21f via a stepped portion 21j extending in a radial direction. An output shaft 22 is positioned inside the case 21 and is freely rotatably supported by the base frame 5b.

The output shaft 22 is integrally formed with a rotor cam 23 at the side of the operating lever 12 of the base frame 5b. The output shaft 22 is further formed integrally with the pinion gear 13 at an opposite side to the operating lever 12 of the base frame 5b. The rotor cam 23 exhibits an approximately hexagonal shape having an outer surface as a cam surface 23a and grooves 23b each defined at an intermediate of the corresponding edge of the hexagonal surface. According to the embodiment of the present invention, the rotor cam 23 and the pinion gear 13 are each formed integrally with the output shaft 22. However, the rotor cam 23 and the pinion gear 13 can be each separated from the output shaft 22 and can rotate integrally therewith.

Figure 10A:
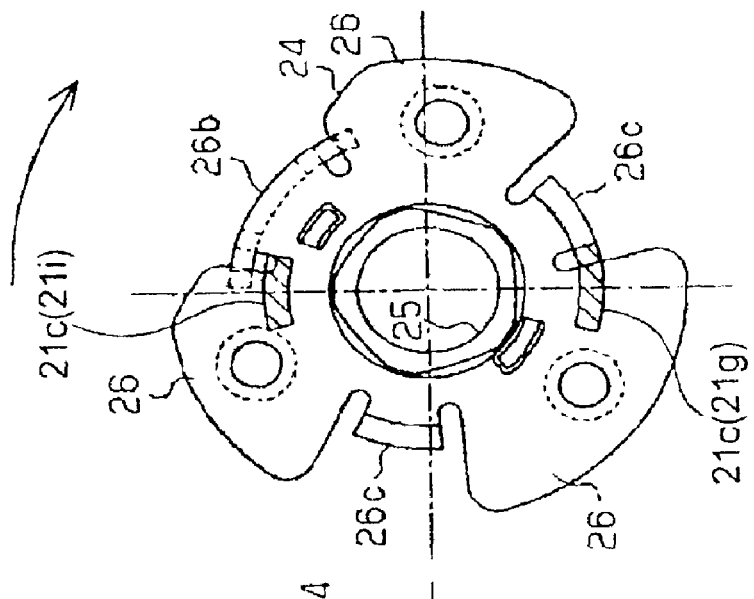
FIGS. 10A, 10B and 10C are explanatory views explaining an operation of the input side member.
Figure 10B:
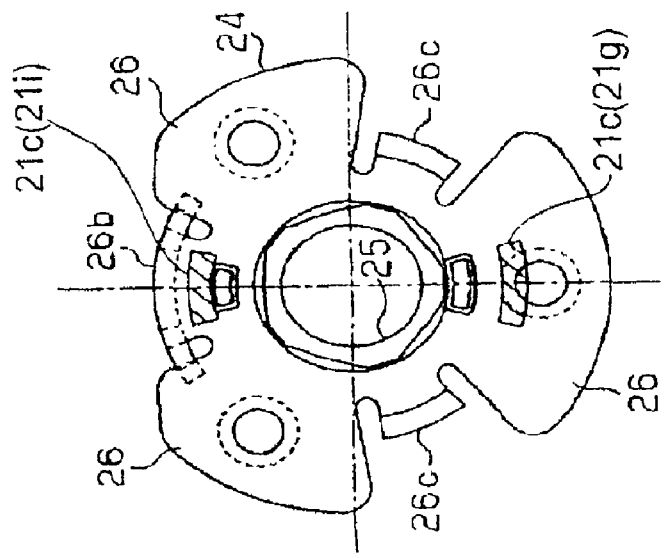
Figure 10C:
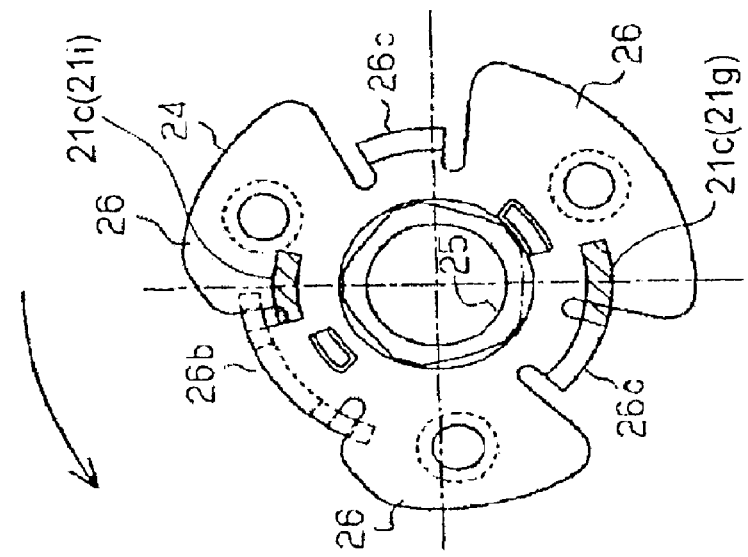

Further, the output shaft 22 supports an input side member 24 to be freely rotatable, which input side member 24 is attached with the operating lever 12. As illustrated in FIG. 4, the input side member 24 includes an inner race 25, which is formed in an approximately cylindrical shape and into which the output shaft 22 is inserted, and a planar-shaped lever contact portion 26, which extends from the inner race 25 outwardly in a radial manner. As illustrated in FIG. 6, the lever contact portion 26 are formed with plural bores 26a (three bores in FIG. 6) into which the operating lever 12 is fitted. The bores 26a are arranged in the circumferential direction. Therefore, the input side member 24 can rotate in response to operation of the operating lever 12. As is apparent from FIG. 11, the lever contact portion 26 is further formed with a hook portion 26b extending axially and protrusions 26c which come in contact with the engagement strips 21c in a circumferential direction. The lever contact portion 26 is still further formed with (or still further includes) through bores 26d (first engagement portions, see FIG. 3) penetrating in the axial direction. As illustrated in FIGS. 10A, 10B and 10C, the protrusions 26c of the input side member 24 come in contact with the engagement strips 21c of the case 21 in response to rotation of the input side member 24, wherein a rotation range of the input side member 24 is restrained. FIG. 10A illustrates a state in which the protrusions 26c are in contact with the engagement strips 21c in response to a clockwise rotation of the input side member 24. FIG. 10B illustrates the input side member 24 in a neutral position. FIG. 10C illustrates a state in which the protrusions 26c are in contact with the engagement strips 21c in response to a counterclockwise rotation of the input side member 24.

As is apparent from FIGS. 3 and 4, attached to a distal end of the output shaft 22 are an elastic member 27, which is made of a waved spring or a disc spring, washers 28a and 28b, by means of a bolt 29. The input side member 24 is biased in the axial direction by biasing force of the elastic member 27. As viewed from a cross section in which its axis penetrates at right angles in FIG. 7, the inner race 25 exhibits an annular shaped inner periphery and approximately pentagonal shaped outer periphery, and the outer peripheral surface of the inner race 25 serves as a cam surface 25a.

Further, as illustrated in FIGS. 3 and 4, a return member 31 and a control member 32 are arranged at a radially outward side of the input side member 24 inside the case 21. The return member 31 is idly fitted at a radially outward side of the inner race 25. The return member 31 includes a cylindrical portion 31a and plural contact portions 31b extending in the axial direction from the cylindrical portion 31a and protruding to the opposite side to the operating lever 12. The quantity of the contact portions 31b of the return member 31 depends of the shape of the inner race 25 of the input side member 24. According to the embodiment of the present invention, there are five contact portions 31b arranged at the same interval in the circumferential direction. The return member 31 is further formed with (or further includes) a hook portion 31c axially extending and projections 31d (second engagement portions) axially fixed into the through bores 26d. According to the embodiment, there is a clearance defined in the circumferential direction at the mating portion of each through bore 26d and the corresponding projection 31d.

The control member 32 is idly fitted at the radially outward side of the return member 31. The control member 32 includes an annular shaped outer race 32a, first engagement portions 32b and second engagement portions 32c. The first and second engagement portions 32b and 32c protrude along the axial direction from the outer race 32a to the opposite side to the operating lever 12 and are arranged in turn along the circumferential direction. The outer race 32a is positioned at the radially outward side of the contact portions 31b of the return member 31. A diameter of the outer peripheral surface of the outer race 32a is approximately identical to the diameter of the inner circumferential surface of the reduced diameter potion 21e of the case 21. Each first engagement portion 32b is fitted with a predetermined looseness into the corresponding groove 23b of the rotor cam 23. Each second engagement portion 32c is formed into an approximately L-shaped structure having a stepped portion 32e extending radially outwardly from the outer race 32a. A portion of each second engagement portion 32e, which extends axially, is arranged to be radially more outward than the first engagement portions 32b.

Figure 7:
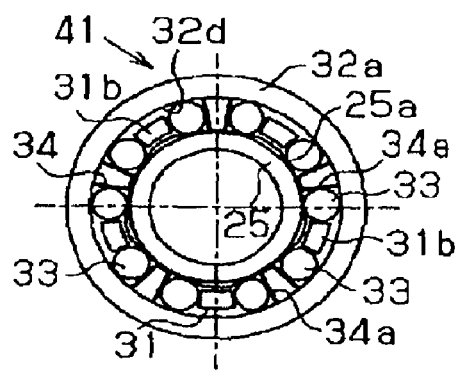
FIG. 7 is a sectional view taken along line VII-VII in FIG. 4.

As illustrated in FIGS. 4 and 7, multiple spaces (five) are defined, which are surrounded by the cam surface 25a of the inner race 25, the inner circumferential surface 32d of the outer race 32a of the control member 32, the return member 31 and the rotor cam 23. The five spaces are arranged along the cam surface 25a and are separated by the contact portions 31b. Because the inner circumferential surface 32d of the control member 32 exhibits an approximately cylindrical shape and the cam surface 25a of the inner race 25 exhibits a polygonal shape, each space exhibits a shape where a distance between the inner circumferential surface 32d of the control member 32 and the cam surface 25a of the inner race 25 is gradually reduced towards its ends in the circumferential direction. As illustrated in FIG. 7, each space houses therein two first rollers 33, and a first looseness preventive spring 34 is inserted into the two first rollers 33. The first rollers 33 transmit operation force of the operating lever 12 from the cam surface 25a of the inner race 25 of the input member 24 to the inner circumferential surface 32d of the outer race 32a of the control member 32. As illustrated in FIG. 3, the first looseness preventive spring 34 includes spring portions 34a each arranged between the corresponding first rollers 33 and a connecting portion 34b connecting the plural spring portions 34a. Each spring portion 34a biases the first rollers 33 arranged at both circumferential sides thereof and exerts a biasing force in the same directions. Accordingly, each spring portion 34a biases the first rollers 33 toward the tops of the inner race 25 having the outer peripheral surface formed into an approximately polygonal shape, i.e., biases the first rollers 33 toward ends of the corresponding space which is a narrowed and wedge-shaped space defined by the cam surface 25a of the inner race 25 and the circumferential surface 32d of the control member 32 facing the cam surface 25a in the radial direction. According to the embodiment, the cam surface 25a of the input member 24, the inner circumferential surface 32d of the control member 32 and each spring portion 34a are structured in a manner that the first rollers 33 are not displaced due to a play or looseness in the wedge-shaped space in the case of a neutral position.

As illustrated in FIGS. 3 and 7, the first clutch mechanism 41 is structured, as described above, with the input member 24 (inner race 24), the return member 31, the first rollers 33, the first looseness preventive spring 34 and the control member 32.

As is apparent from FIGS. 4 and 5, defined are plural spaces, which are surrounded by the cam surface 23a of the rotor cam 23, the inner circumferential surface 21d of the case 21 and the base frame 5b and are defined by the second engagement portions 32c of the control member 32. The second engagement portions 32c are arranged along the cam surface 23a of the rotor cam 23. According to the embodiment of the present invention, there are six spaces being defined. As described above, the cam surface 23a of the rotor cam 23 is formed into a polygonal shape and the inner circumferential surface 21d of the case 21 is formed into a cylindrical shape, which provides a basis of that each space exhibits a shape in which a distance between the inner circumferential surface 21d and the cam surface 23a is reduced gradually towards its circumferential directional ends.

As is obvious from FIG. 5, accommodated in each space are two second rollers 35 and a second looseness preventive spring 36 inserted into the two second rollers 35 in the respective spaces. Going back to FIG. 3, the second looseness preventive spring 36 includes spring portions 36a each arranged in the two corresponding second rollers 35 in each space and a connecting portion 36b connecting the plural spring portions 36a. The base portion of each spring portion 36a is housed in the corresponding fitting groove 23b of the rotor cam 23. Each spring portion 36a biases the corresponding second rollers 35 toward the tops of the rotor cam 23 having the outer circumferential surface formed into an approximately polygonal shape, i.e., biases the corresponding second rollers 35 toward ends of the corresponding space which is a narrowed and wedge-shaped space defined by the cam surface 23a of the rotor cam 23 and the inner circumferential surface 21d of the case 21 facing the cam surface 23a in the radial direction.

As illustrated in FIGS. 3 and 6, a second clutch mechanism 42 is structured, as described above, with the control member 32 (the first engagement portions 32b and the second engagement portions 32c), the rotor cam 23, the second rollers 35, the second looseness preventive spring 36 and the case 21. According to the embodiment, the first clutch mechanism 41 and the second clutch mechanism 42 are arranged in the vicinity of each other in the axial direction.

Figure 11:
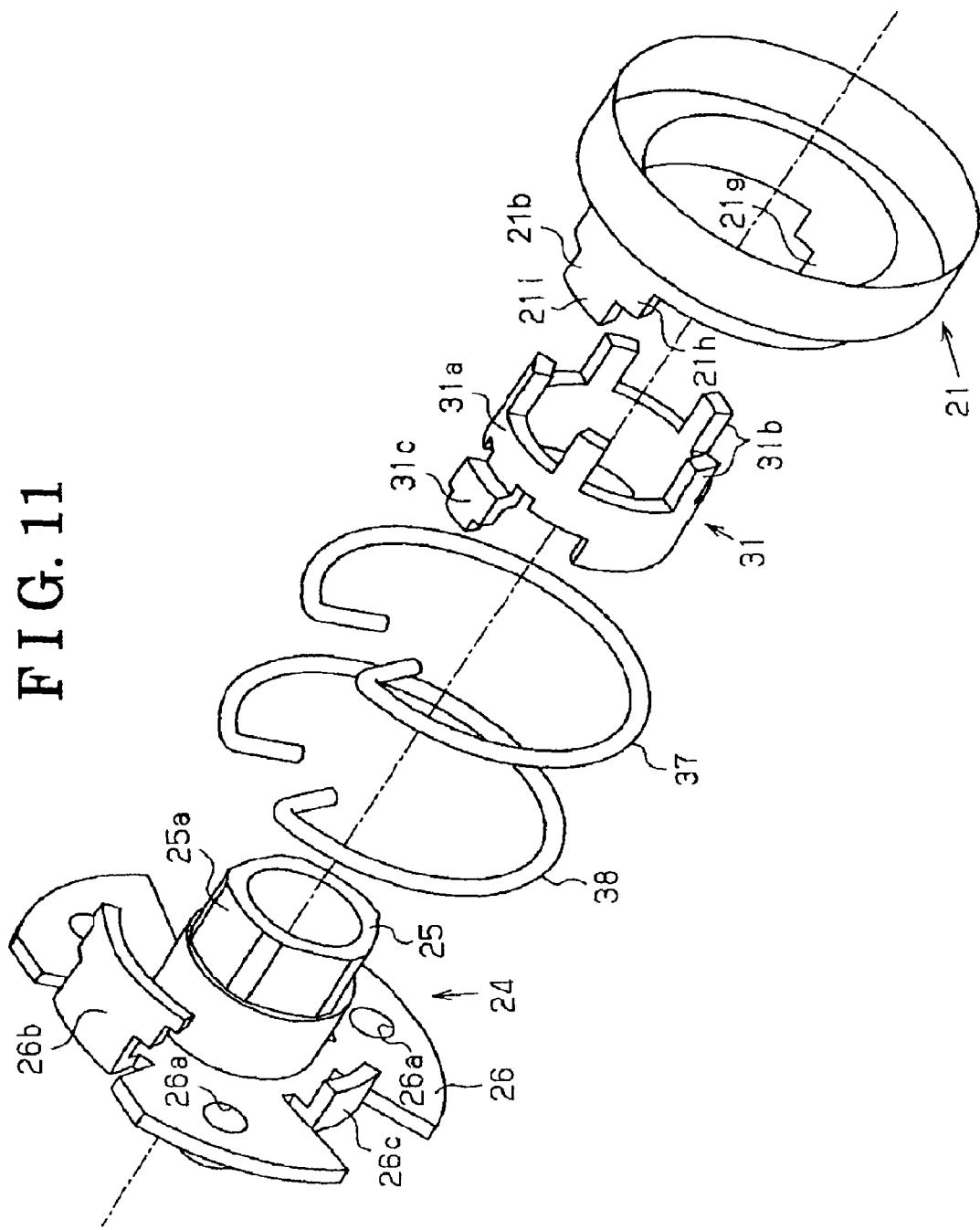
FIG. 11 is a perspective view for explaining the clutch apparatus.

As illustrated in FIGS. 3, 4 and 10, the clutch apparatus 11 further includes a first torsion spring 37 as a first elastic member and a second torsion spring 38 as a second elastic member. The case 21 includes the hook portions 21b, each of which extends in the axial direction from the reduced diameter portion 21e and serves as an elastic member engagement portion, and an engagement portion 21g as input side member engagement portion. The hook portion 21b, which is illustrated at the upper side in FIG. 11, is formed with a first engagement portion 21h (first elastic member engagement portion) near the reduced diameter portion 21e. The hook portion 21b is further formed with a second engagement portion 21i as a second elastic member engagement portion. The second engagement portion 21i forms a distal end of the hook portion 21b and is narrower in the circumferential direction than the first engagement portion 21h. The first engagement portion 21h is engaged with the first torsion spring 37 while the second engagement portion 21i is engaged with the second torsion spring 38.

Figure 8A:
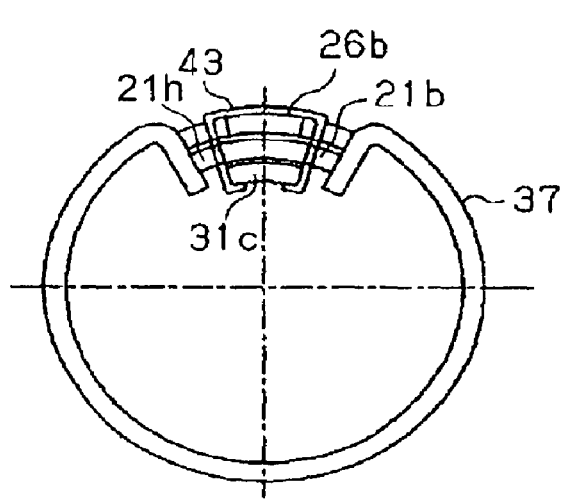
FIGS. 8A and 8B are explanatory views of a return spring.

The input side member 24 is formed with a hook portion 26b, which is engageable with the first torsion spring 37 and serves as a first engagement portion, and protrusions 26c which come in contact with the engagement portions 21g of the case 21 in the circumferential direction. As illustrated in FIG. 8A, the first torsion spring 37 is engaged with the hook portion 21b of the case 21 and the hook portion 26b of the input side member 24. Therefore, the first torsion spring 37 biases the input side member 24 to the neutral position on the basis of the hook portion 21b (first engagement portion 21h). The rotation range of the input side member 24 is restrained by a contact of the protrusions 26c of the input side member 24 with the engagement portions 21g in the circumferential direction.

Figure 8B:
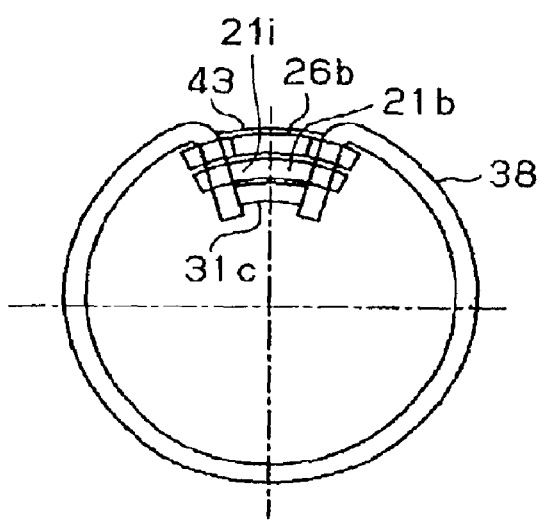

The return member 31 is formed with a hook portion 31c which is engaged with the second torsion spring 38 and serves as a second engagement portion. As illustrated in FIG. 8B, the second torsion spring 38 is engaged with the hook portion 21b of the case 21 and the hook portion 31c of the return member 31. Therefore, the second torsion spring 38 biases the return member 31 to the neutral position on the basis of the hook portion 21b (second engagement portion 21i). The return member 31 is formed with the projections 31d engaged with the lever contact portion 26 of the input side member 24 in a manner that the return member 31 rotates integrally with the input side member 24 (see FIG. 6)

As illustrated in FIG. 3, the case 21, the input side member 24 and the return member 31 are formed with the hook portions 21b, 26b and 31c overlapping in the radial direction. As illustrated in FIG. 8A, the hook portion 21b of the case 21 and the hook portion 26b of the input side member 24 are engaged with the first torsion spring 37. When the input side member 24 is rotated, energy is stored at the first torsion spring 37. Once the operating lever 12 is released from being operated, the input side member 24 is returned to the original neutral position by a spring force accumulated at the first torsion spring 37. That is to say, the first torsion spring 37 is configured to store the operation force when the operating lever 12 is operated and to return the input side member 24 to the neutral position by the operation force as an elastic force when the operating lever 12 is not operated.

Further, as illustrated in FIG. 8B, the hook portion 21b of the case 21 and the hook portion 31c of the return member 31 are engaged with the second torsion spring 38. When the input side member 24 rotates, energy is stored at the second torsion spring 38. Once the operating lever 12 is released from being operated, a spring force stored in the second torsion spring 38 returns the return member 31 to the original neutral position.

According to the embodiment of the present invention, as illustrated in FIGS. 8A and 8B, a leaf spring 43, as a biasing member, is disposed between the hook portion 36b of the input side member 24 and the hook portion 31c of the return member 31 so as to bias the return member 31 towards the input side member 24.

Further, as illustrated in FIG. 4, the base frame 5b is firmly attached with an auxiliary frame 16 at a position where the clutch apparatus 11 is supported. The auxiliary frame 16 is secured, at its base end portion, to the base frame 5b for example by means of a bolt, and an opening end of the auxiliary frame 16 extends so as to be in parallel to the base frame 5b with a predetermined distance.

The auxiliary frame 16 is formed with a through hole to be a first bearing 17, while the base frame 5b is formed with a through hole to be a second bearing 18 arranged to be coaxial with the first bearing 17. The second bearing 18 possesses a diameter larger than the one of the first bearing 17.

The output shaft 22 is supported, at its axially intermediate portion, by the second bearing 18 so as to be rotatable. The output shaft 22 is supported, at its distal end, by the first bearing 17 so as to be rotatable. The teeth 14a of the sector gear 14 are gear-meshed with the pinion gear 13 between the auxiliary frame 16 and the base frame 5b.

Figure 9:
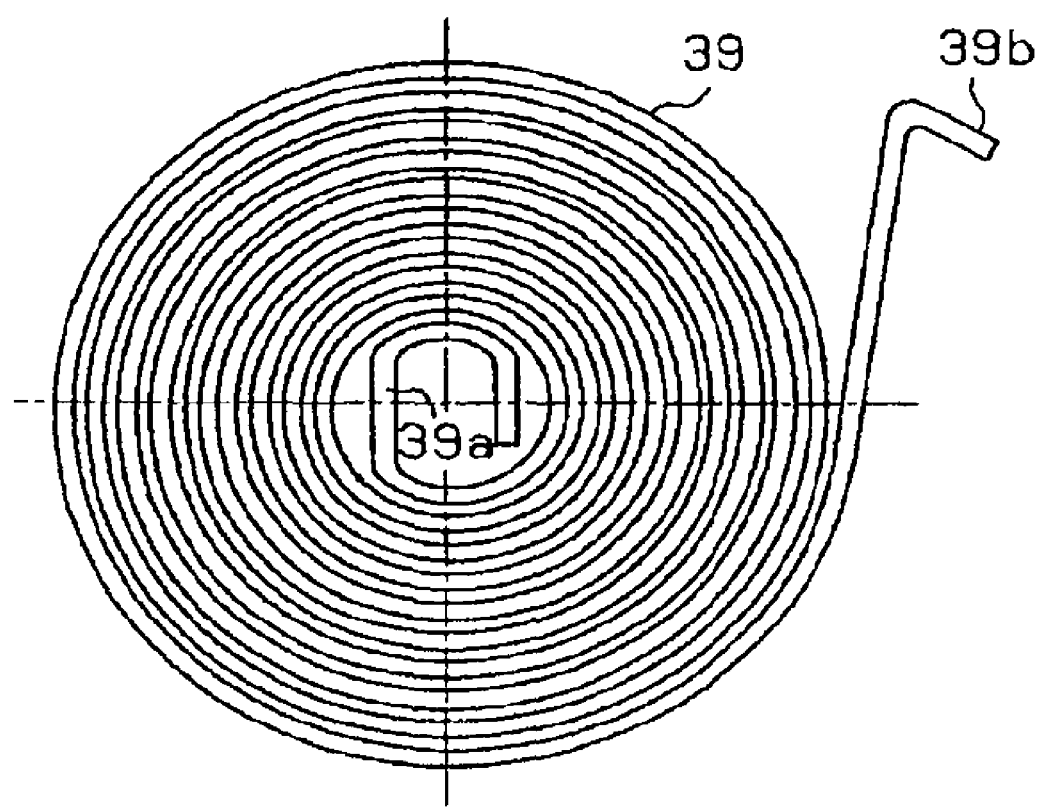
FIG. 9 is a front view of a spiral spring.

As illustrated in FIG. 4, the output shaft 22 is formed, at a distal end at the side of the pinion gear 13, with two parallel flat surfaces 22a. A spiral spring 39 is arranged so as to surround the distal end of the output shaft 22. As illustrated in FIG. 9, an inner end 39a of the spiral spring 39 is shaped so as to face approximately in parallel and forms a bore, into which the distal end of the output shaft 22 is inserted and which comes in contact with the flat surfaces 22a of the output shaft 22. The outer end 39b of the spiral spring 39 is engaged with a latch shaft 40 supported between the auxiliary frame 16 and the base frame 5b. Therefore, biasing force of the spiral spring 39 applies a predetermined amount of rotational torque to the output shaft 22 with the fulcrum of the base frame 5b. The rotational torque then operates to lift up the base frames 5a and 5b.

Described below is an operation of the seat adjusting apparatus for a vehicle provided with the clutch apparatus 11 described above. As illustrated in FIG. 4, once an operator or user rotates the operating lever 12 in a direction for lifting up the seat cushion 1a, the input side member 24 attached with the operating lever 12 rotates integrally with the operating lever 12. In this case, the return member 31, of which projections 31d are fitted into the through bores 26d of the input side member 24, rotates integrally with the input side member 24. However, because there is a clearance in the circumferential direction at a mating portion of each through bore 26d and the corresponding projection 31d, the return member 31 rotates after the input side member 24 slightly rotates. Therefore, the first rollers 33 are prevented from being engaged in the case of an initial rotation of the input side member 24 and are operated properly to a position corresponding to a rotational position of the input side member 24.

The inner race 25 illustrated in FIG. 7 rotates for example in a clockwise direction in response to rotation of the input side member 24, wherein the first rollers 33, which are arranged between the cam surface 25a of the inner race 25 and the control member 32 in each space, are locked at the wedge-shaped clearance in a manner that the rollers 33 are engaged not to move. As a result, rotation of the inner race 25 is transmitted to the control member 32. As described above, in the first clutch mechanism 41, in circumstances where the operating lever 12 is driven to operate, an operation force of the operating lever 12 is transmitted from the input side member 24 to the control member 32. Further, as illustrated in FIGS. 10A, 10B and 10C, the rotational range of the input side member 24 is limited with the protrusions 26c of the input side member 24 in contact with the engagement strips 21c of the case 21 in the circumferential direction.

Once the control member 32 rotates, the first engagement portions 32b of the control member 32 come in contact with side surfaces of the corresponding fitting grooves 23b of the rotor cam 23, wherein the rotor cam 23 is rotated in the clockwise direction in FIG. 3. Here, the second rollers 35, which are arranged between the cam surface 23a of the rotor cam 23 and the inner peripheral surface 21d of the case 21, are pushed by the second engagement portions 32c in the rotational direction of the rotor cam 23. Therefore, the second rollers 35 are not locked or engaged at the wedge-shaped clearance in each space in a manner that the second rollers 35 move. That is, the output shaft 22 rotates in response to operation of the operating lever 12. In such circumstances, because the clearance defined between each second roller 35 and the corresponding second engagement portion 32c is smaller than the clearance defined in the circumferential direction between the base portion of each spring portion 36a and the corresponding first engagement portion 32b, once the control member 32 rotates, the second engagement portions 32c push the second rollers 35 in the circumferential direction and the first engagement portions 32b then push wall surfaces of the fitting grooves 23b, wherein the output shaft 22 rotates smoothly. As described above, in the second clutch mechanism 42, when the operating lever 12 is driven to operate, operation force of the operating lever 12 is transmitted to the output shaft 22 from the control member 32. Therefore, the sector gear 14, which is engaged with the pinion gear 13 of the output shaft 22, is rotated. The lifter links 7a and 7b pivotably rotate via the driving link 15 on the basis of rotation of the sector gear 14. As a result, the base frames 5a, 5b and the seat cushion 1a are lifted up. Here, biasing force of the spiral spring 39 exerts in a direction for assisting rotation of the output shaft 22, wherein operation force of the operating lever can be reduced.

Once the operating lever 12 is released from being operated, the output shaft 22 rotates counterclockwise in FIG. 5 due to load such as the weight of the seat 1 and/or a weight of an occupant. Here, the output shaft 22 and the rotor 23 rotate integrally. In response to rotation of the rotor cam 23, likewise as the above, the second rollers 35, which are arranged between the cam surface 23a of the rotor cam 23 and the inner peripheral surface 32d of the case 21, are locked at the wedge-shaped clearance in a manner that the rollers 35 are engaged not to move. Because the case 21 is secured to the base frame 5b, the output shaft 22 is prevented from rotating. That is, in the second clutch mechanism 42, when the operating lever 12 is not driven to operate, the output shaft 22 is restrained from rotating. Here, because the clearance defined between the second rollers 35 and the corresponding first engagement portion 32b is smaller than the clearance defined in the circumferential direction between the base portion of each spring portion 36a and the corresponding first engagement portion 32b, the second rollers 35 are firmly locked or engaged at the wedge-shaped clearance in a manner that the rollers 35 are not moved while the first engagement portions 32b of the control member 32 are not pushed by the wall surfaces of the fitting grooves 23b.

Upon the operating lever 12 is released from being operated as described above, the return member 31 and the input side member 24 are biased by the first torsion spring 37 and the second torsion spring 38 to rotate back to the neutral positions. Here, the first rollers 33 rotate, by the contact portions 31b of the return member 31, in the same rotational direction as the return member 31 and the input side member 24, wherein the first rollers 33 are not locked or engaged and are movable. Therefore, the first rollers 33 are not restrained from returning to the neutral position. That is, in the first clutch mechanism 41, when the operating lever 12 returns to the original position thereof, torque transmitting between the input side member 24 and the control member 32 is cut off.

According to the embodiment of the present invention, the input side member 24 and the return member 31 rotate integrally with the through bores 26d being fitted with the projections 31d. Therefore, when the input side member 24 goes back to the original neutral position, the first rollers 33 are forced to rotate by the contact portions 31b in the wedge-shaped space between the cam surface 25a of the input side member 24 and the inner circumferential surface 32d of the control member 32. Here, the contact portions 31b are positioned at the sides where a distance between the cam surface 25a and the inner circumferential surface 32d is gradually reduced, that is to say, the contact portions 31b is located at a side of an area where a distance between the cam surface 25a and the inner peripheral surface 32d is more reduced than that of an area where the roller 33 is located. Therefore, even if a play does not exist in the wedge-shaped space defined in the first clutch mechanism 41, it is possible to prevent an event that the input side member 24 can not rotate by the locking or the engagement of the first rollers 33 at the wedge-shaped space when the input side member 24 goes back to the original neutral position by the release operation of the operating lever 12.

Especially, according to the embodiment of the present invention, in the case where the second torsion spring 38, which biases the return member 31 toward the original neutral position upon rotation of the return member 31, is provided, if the return member 31 is not structured so as to rotate integrally with the input side member 24, the return member 31 is biased to the neutral position by the second torsion spring 38, wherein the first rollers 33 are easily engaged in the wedge-shaped space. According to the embodiment of the present invention, the return member 31 is engaged with the input side member 24 and rotates integrally in the circumferential direction so that the first rollers 33 can be prevented from being engaged.

Further, the leaf spring 43 biases the hook portion 31c of the return member 31 towards the hook portion 26b of the input side member 24. Therefore, when the return member 31 returns to the neutral position, the return member 31 is applied with biasing force of the leaf spring 43 towards the input side member.

When the operating lever 12, which has been operated to lift up the seat 1, rotates to the neutral position, the clutch apparatus 11 operates in the same manner as the case where the operating lever 12 is released from being operated. Therefore, the rotation of the operating lever 12 is not limited. Further, when the operating lever 12 is operated to rotate in a direction for lifting down the seat 1, the clutch apparatus 11 rotates in an opposite direction and functions in the same manner. Therefore, the operation of the clutch apparatus 11 for the case in which the operating lever 12 is operated to rotate in the direction for lifting down the seat 1 will be omitted herein.

The following effects are obtained according to the embodiment of the present invention.

(1) The return member 31 rotates integrally with the input side member 24. Therefore, when the input side member 24 rotates and returns to the original neutral position in response to releasing of the operating lever 12 from an operated state, the first rollers 33 rotate with the contact portions 31b arranged at the sides, where the distance between the cam surface 25a and the inner circumferential surface 32d is narrowed, in each wedge-shaped space. As described above, the first rollers 33 are forced to move in response to rotation of the input side member 24, wherein it is possible to prevent an event that the input side member 24 can not rotate by the locking or the engagement of the first rollers 33 at the wedge-shaped space when the input side member 24 goes back to the original neutral position by the release operation of the operating lever 12. Therefore, it is possible to reduce an amount of play in each wedge-shaped space and to improve an operation performance of the operating lever 12 in the neutral position.

(2)

Provided is the leaf spring 34 which biases the return member 31 towards the input side member 24. Therefore, when the operating lever 12 is returned to the original neutral position after the rotation of the input side member 24 and the return member 31 in response to an operation of the operating lever 12, the return member 31 is biased toward the input side member 24 and rotates integrally with the input side member 24.

Conventionally, there is a seat for a vehicle provided with a seat adjusting apparatus, which adjusts the height or the surface level of a seat cushion. In such seat adjusting apparatus for a vehicle, the height of the seat cushion can be adjusted in a case where an occupant is seated on the seat.

The seat adjusting apparatus outputs torque in a normal direction or a reverse direction in response to an operation of an operating lever and adjusts the height of the seat cushion. Further, the seat adjusting apparatus includes a first clutch and a second clutch which retains the seat cushion at the appropriate height or position in a state where the operating lever has been released.

Once an operation force is applied to the operating lever, the operation force is transmitted to an output shaft via the first and second clutches. The second clutch prohibits the output shaft from rotating when the operating lever is not driven to operate. The seat adjusting apparatus further includes: a torsion spring returning the input side member connected to the operating lever when the operating lever is not inputted with an operation force; and a stopper restraining a rotational range of the input side member when the operating lever is operated.

Therefore, an outer race of the second clutch mechanism includes a flange serving as a stopper for restraining a rotation of the input side member and an engagement portion engaged with a torsion spring, as disclosed in JP2003-93187A (FIG. 20).

However, the flange is formed by incising a flat portion of the outer race, which may deteriorate a mechanical rigidity of the outer race. This may require a process for working the incised portion. Further, because the flange is formed by being the incised portion, which limits the height of the flange and an axial height. In such circumstances, the torsion spring, which has a diameter different from the one of the outer race, is require to be located at the same axial position coaxially with the outer race. Therefore, it is necessary to increase the diameter of the outer race for the purpose of generating a predetermined amount of spring torque. This however causes upsizing of the apparatus.

The present invention has been made in view of the above circumstances and provides a seat adjusting apparatus downsized and formed with a simple structure and downsized.

(1) According to the embodiment of the present invention, the hook portion 21b extends axially from the reduced diameter portion 21e housing the first clutch mechanism 41 and the second clutch mechanism 42. Therefore, there is no need to apply a notching process or a bending process and so on so that the case 21 can be simply structured.

(2) The hook portion 21b, which is engaged with the first torsion spring 37 and the second torsion spring 38, extends axially from the reduced diameter portion 21e. Therefore, the axial length of the hook portion 21b is not limited and is formed in a way that the first and second torsion springs 37 and 38 are engaged appropriate points of the hook portion 21b respectively. This prevents upsizing of the apparatus in the radial direction and enables to downsize the apparatus.

(3) The engagement portion 21g, which comes in contact with the protrusion 26c of the input side member 24 and restrains rotation of the input side member 24, extends in the axial direction from the reduced diameter portion 21e. Therefore, there is no need to apply additional processes to the reduced diameter portion 21e, such as a notching process, a bending process or the like, and the case 21 is simply structured.

(4) The first engagement portion 21h, which is engaged with the first torsion spring 37, and the second engagement portion 21i, which is engaged with the second torsion spring 38, are formed continuously in the axial direction. Therefore, because the first and second torsion springs 37 and 38 can possess any diameters respectively, a radial directional size can be reduced by designing the first and second torsion springs 37 and 38 having the same diameter, which downsizes the apparatus.

(5) The first engagement portion 21h, which is engaged with the first torsion spring 37, and the second engagement portion 21i, which is engaged with the second torsion spring 38, are arranged at the same position in the circumferential direction. Therefore, a member (the hook portion 21b) can be shared by the first torsion spring 37 and the second torsion spring 38.

The embodiment of the present invention is not limited to the above and can be modified as follows.

According to the embodiment of the present invention, the return member 31 is engaged with the input side member 24 in the circumferential direction and rotate integrally with the projections 31d of the return member 31 fitted into the through bores 26d of the input side member 24 in the axial direction. However, the return member 31 can be engaged with the input side member 24 in another manner. For example, the input side member 24 can be provided with a projection as the first engagement portion, while the return member 31 can be provided with a recess as the second engagement portion. The input side member 24 and the return member 31 can rotate integrally with each other with the recess engaged with the projection.

According to the embodiment, provided is the leaf spring 43 serving as the biasing member biasing the return member 31 towards the input side member 31. More particularly, the leaf spring 43 biases the hook portion 31c of the return member 31 toward the hook portion 26b of the input side member 24. However, in substitution for the leaf spring 43, an elastic member such as a rubber can be disposed in a circumferential directional clearance between each through bore 26d of the input side member 24 and the corresponding projection 31d of the return member 31.

According to the embodiment, the case 21 of the clutch apparatus 11 is directly secured to the base frame 5b. However, the case 21 can be secured to a base supporting the output shaft 22 so as to unitize the clutch apparatus.

According to the embodiment, the seat cushion 1a is biased by the spiral spring 39 so as to be lifted up. However, the seat cushion 1a can be biases by another elastic member such as a torsion bar.

According to the embodiment, the cylindrical portion housing the first clutch mechanism 41 and the second clutch mechanism 42 includes the reduced diameter portion 21e and the enlarged diameter portion 21f. However, the shape of the cylindrical portion is not limited to the above. For example, a portion housing the first clutch mechanism can possess a diameter approximately identical to the one of a portion housing the second clutch mechanism.

As described above, the return member rotates integrally with the input side member. When the input side member rotates and returns to the neutral position when the operating member is driven to operate, the contact portion, which is located in the wedge-shaped space at the side of an area, where a distance between the cam surface and the inner peripheral surface is reduced, rotates with the roller. Therefore, the rotor is forced to move in response to rotation of the input side member and the rotor is trapped, wherein a rotational error is avoided. Accordingly, a play in the wedge-shaped space can be reduced, and a user can obtain an appropriate operating feeling when operating the operating member, wherein it is possible to enhance an operability of the operating member at the neutral position.

It is preferable that the seat adjusting apparatus includes the biasing member biasing the return member towards the input side member. In this case, when the input side member is returned to the original neutral position after the input side member and the return member rotates in response to an operation of the operating member, the return member is biased toward the input side member so that the return member rotates integrally with the input side member.

According to the seat adjusting apparatus for a vehicle, it is possible to enhance an operability of the operating member at the neutral position.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A clutch device for a seat lifting apparatus of a vehicle, comprising:
   a friction brake portion that transmits rotation of an operational lever to an output shaft;
   an output gear disposed on the output shaft;
   a biasing force receiving portion including a bush provided on the output shaft and that receives a biasing force which assists a rotation of the output shaft;
   a first bearing portion provided at one side of the biasing force receiving portion and the output gear;
   a second bearing portion provided at the other side of the biasing force receiving portion and the output gear, the first bearing portion and the second bearing portion rotatably supporting the output shaft at both sides of the biasing force receiving portion and the output gear;
   a base frame that rotatably supports the output shaft;
   an auxiliary frame configured to attach to the base frame; and
   a supporting shaft that receives the biasing force.

2. The clutch device for a seat lifting apparatus of a vehicle according to claim 1, further comprising a spiral spring provided between the first bearing portion and the second bearing portion that supplies the biasing force to the output gear and the biasing force receiving portion, the first bearing portion and the second bearing portion being provided on the auxiliary frame and the base frame respectively.

3. The clutch device for a seat lifting apparatus of a vehicle according to claim 2, wherein the bush includes an engaging groove, the bush is fitted into the output shaft so as to prevent a relative rotation between the output shaft, and the bush and the engaging groove are configured to be engaged with the one end of the spiral spring.

4. The clutch device for a seat lifting apparatus of a vehicle according to claim 2, wherein the supporting shaft is disposed between the auxiliary frame and the base frame.

5. The clutch device for a seat lifting apparatus of a vehicle according to claim 1, wherein the output shaft includes a first diameter and a second diameter larger than the first diameter, and a diameter of a portion of the output shaft disposed within the first bearing portion is the first diameter.

6. The clutch device for a seat lifting apparatus of a vehicle according to claim 2, wherein the supporting shaft abuts the spiral spring at an outer circumferential side end portion.

7. The clutch device for a seat lifting apparatus of a vehicle according to claim 2, wherein the supporting shaft extends from the auxiliary frame toward the spiral spring.

* * * * *